United States Patent Office.

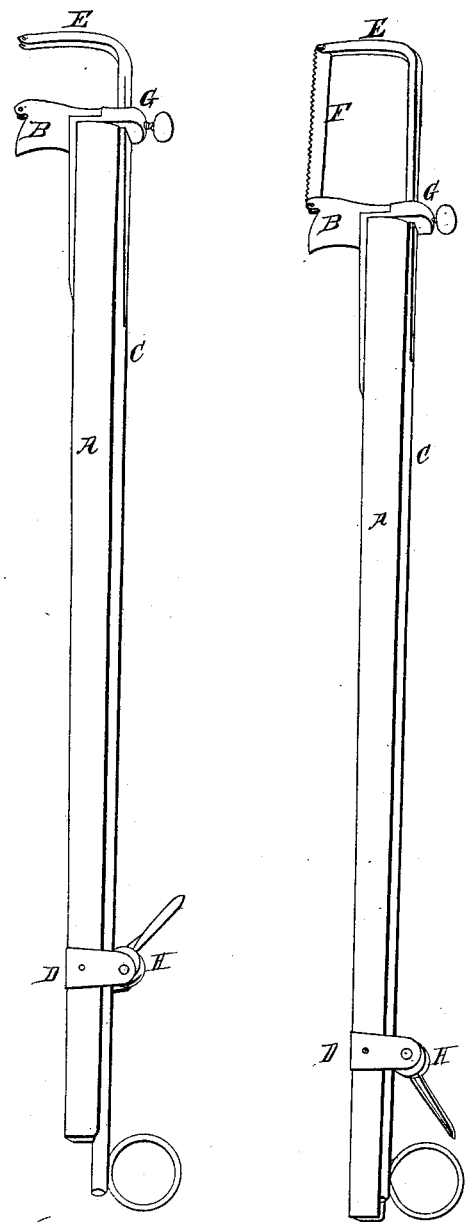

GEORGE TANNER, OF FREETOWN, NEW YORK.

Letters Patent No. 82,177, dated September 15, 1868.

IMPROVEMENT IN FRUIT-GATHERER.

The Schedule referred to in these Letters Patent and making part of the same.

TO ALL WHOM IT MAY CONCERN:

Be it known that I, GEORGE TANNER, of Freetown, in the county of Cortland, and State of New York, have invented a new and useful Tree-Pruner and Fruit-Gatherer combined; and I do hereby declare that the following is a full, clear, and exact description of the construction and operation of the same, reference being had to accompanying drawings, making a part of this my specification.

A is a light wooden rod, of such length that with it the operator, standing upon the ground, may reach the upper limbs of the tree. Upon the upper end of this rod is a cross-head piece, of iron, projecting upon one side, and forming a pruning-knife, B, with its back slightly curved, as represented. Upon the other side this rod is plowed out its whole length, to admit, in the furrow, the light iron rod C, which slides up or down in such furrow. The rod C passes through a mortise in the head-piece, and under the clasp D, upon the lower end of the wooden rod, in which is a cam, by which the rod C is held in place.

The upper end of the rod C is bent, to form a hook, E. Between the outer ends of the knife B and the curved hook E is strained a light saw, F. When strained sufficiently taut, the thumb-screw at G is turned down upon the rod C, and holds the saw strained as long as desired.

The apparatus is now in condition for pruning, using the knife or saw, as the operator desires.

To use for gathering fruit or bringing the branches down within reach, the saw is taken out, by simply removing the pins at the ends, the hook E is placed over any branch, and, by the handle on the rod C, this rod and its hook E are drawn down until the limb is clamped between the hook E and the back of the knife B, and by turning the cam H, at the lower end of the apparatus, the rod C is fastened, and the limb held securely to shake the fruit from it, or to bring it within reach, so that the fruit may be picked off.

What I claim, and desire to secure by Letters Patent, is—

1. The combination of the rod C with its hook E, and the rod A with its cross-head piece, to form an adjustable clamp for the uses and purposes set forth.

2. In combination with the above, I claim the saw F, when arranged to operate as described.

GEORGE TANNER.

Witnesses:
 AUGUSTIN CARTER,
 B. B. WOODWORTH.